Dec. 4, 1934.  G. MAURER  1,983,179
MACHINE FOR BORING AND PLUGGING HOLES IN WOOD
Filed Sept. 20, 1933  4 Sheets-Sheet 1

Inventor:
Gottfried Maurer

Dec. 4, 1934.  G. MAURER  1,983,179
MACHINE FOR BORING AND PLUGGING HOLES IN WOOD
Filed Sept. 20, 1933   4 Sheets-Sheet 2

Inventor:
Gottfried Maurer.

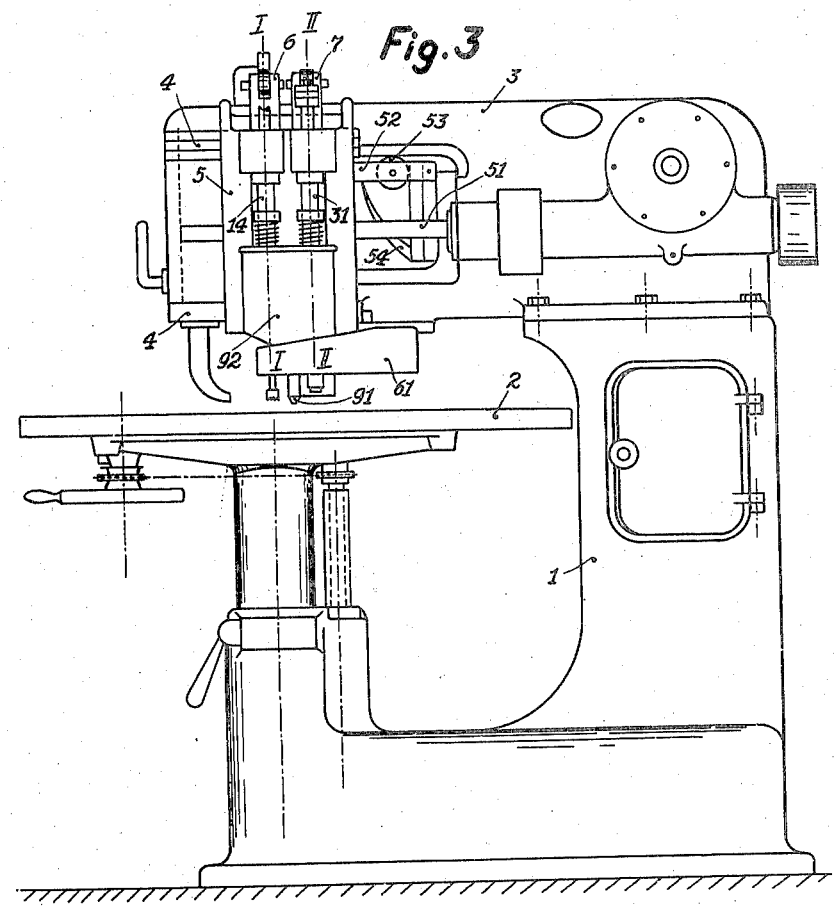
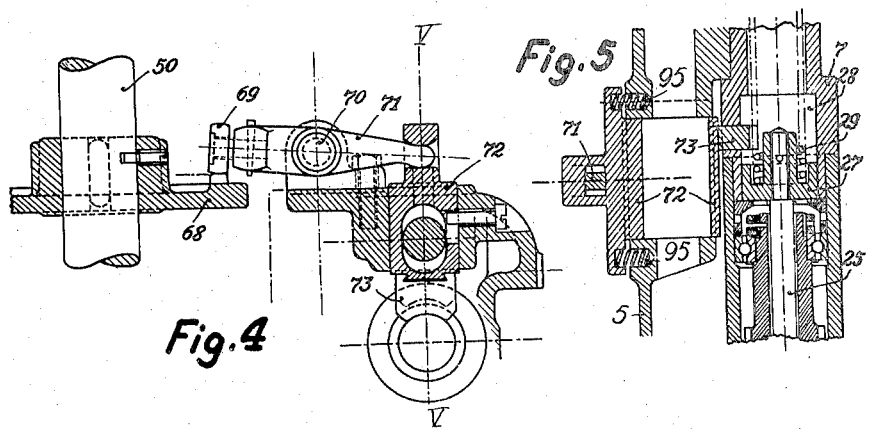

Dec. 4, 1934.  G. MAURER  1,983,179
MACHINE FOR BORING AND PLUGGING HOLES IN WOOD
Filed Sept. 20, 1933  4 Sheets-Sheet 4
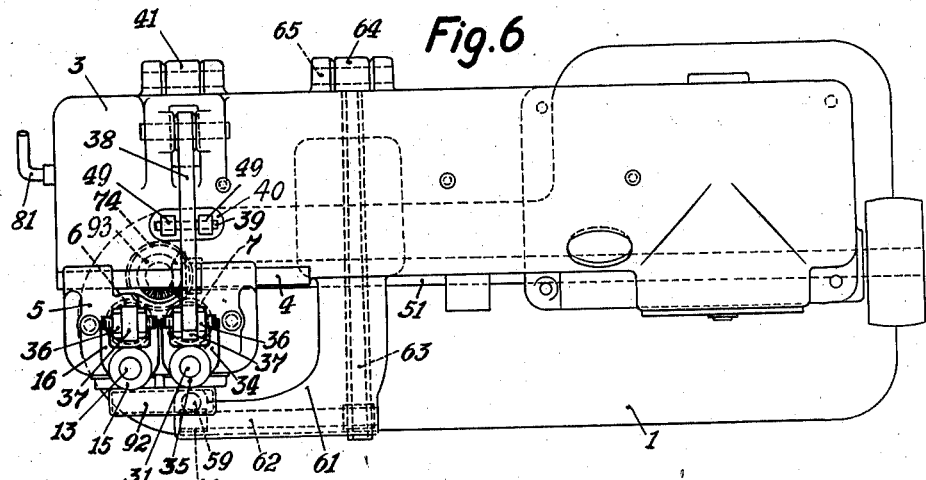
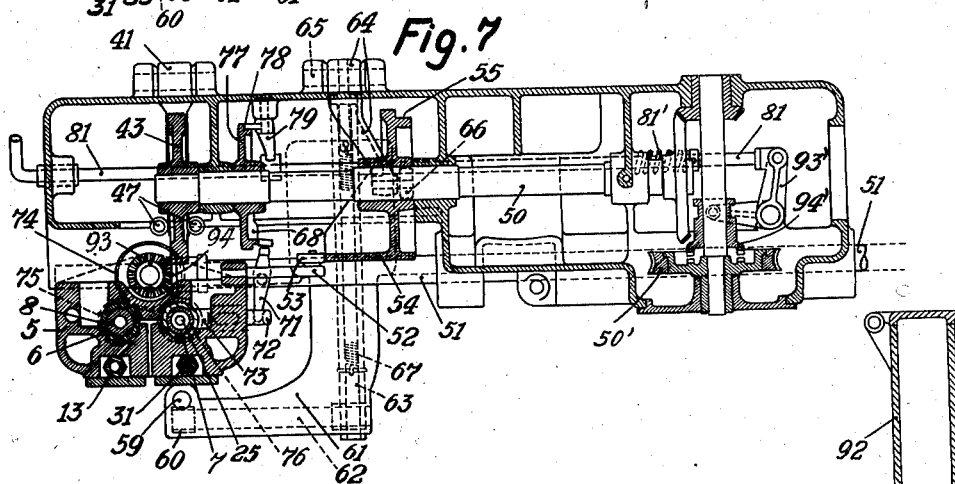
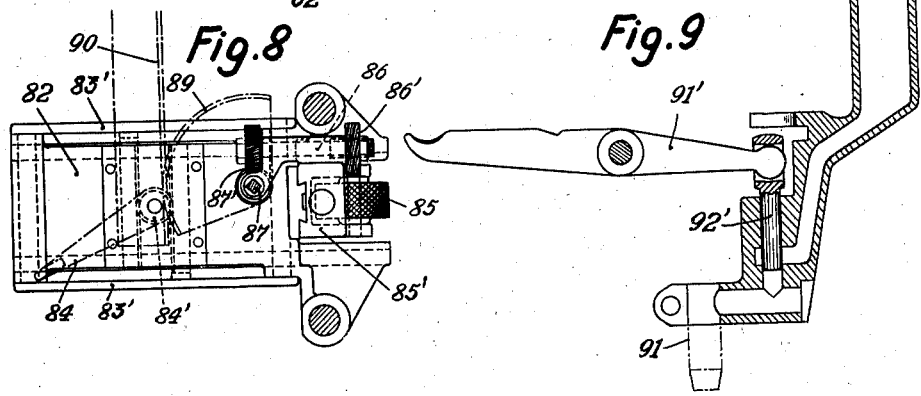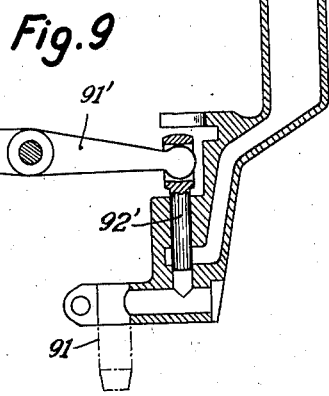
Inventor:
Gottfried Maurer Patented Dec. 4, 1934

1,983,179

UNITED STATES PATENT OFFICE 1,983,179

MACHINE FOR BORING AND PLUGGING HOLES IN WOOD

Gottfried Maurer, Zurich, Switzerland

Application September 20, 1933, Serial No. 690,210
In Germany September 21, 1932

5 Claims. (Cl. 144—2)

This invention relates to a machine for boring and plugging holes in wood with the object of removing unsightly knots from the surface of the wood.

In a known machine of this kind, the plugs are either cut from a round rod in the machine itself or made separately from the machine and supplied to the latter through a magazine.

According to the present invention, a cutter is employed which cuts the plugs from a wooden slat, and a plunger whereby the plugs are forced into the bore holes, is mounted in and operates through a central bore in the spindle of said cutter.

Each tool cooperates with a stop rod which is applied with spring pressure to the surface of the wood and which limits the downward movement of the resiliently depressed tools. Owing to this arrangement the tools will adjust themselves automatically to different thicknesses of wood.

Figure 1:
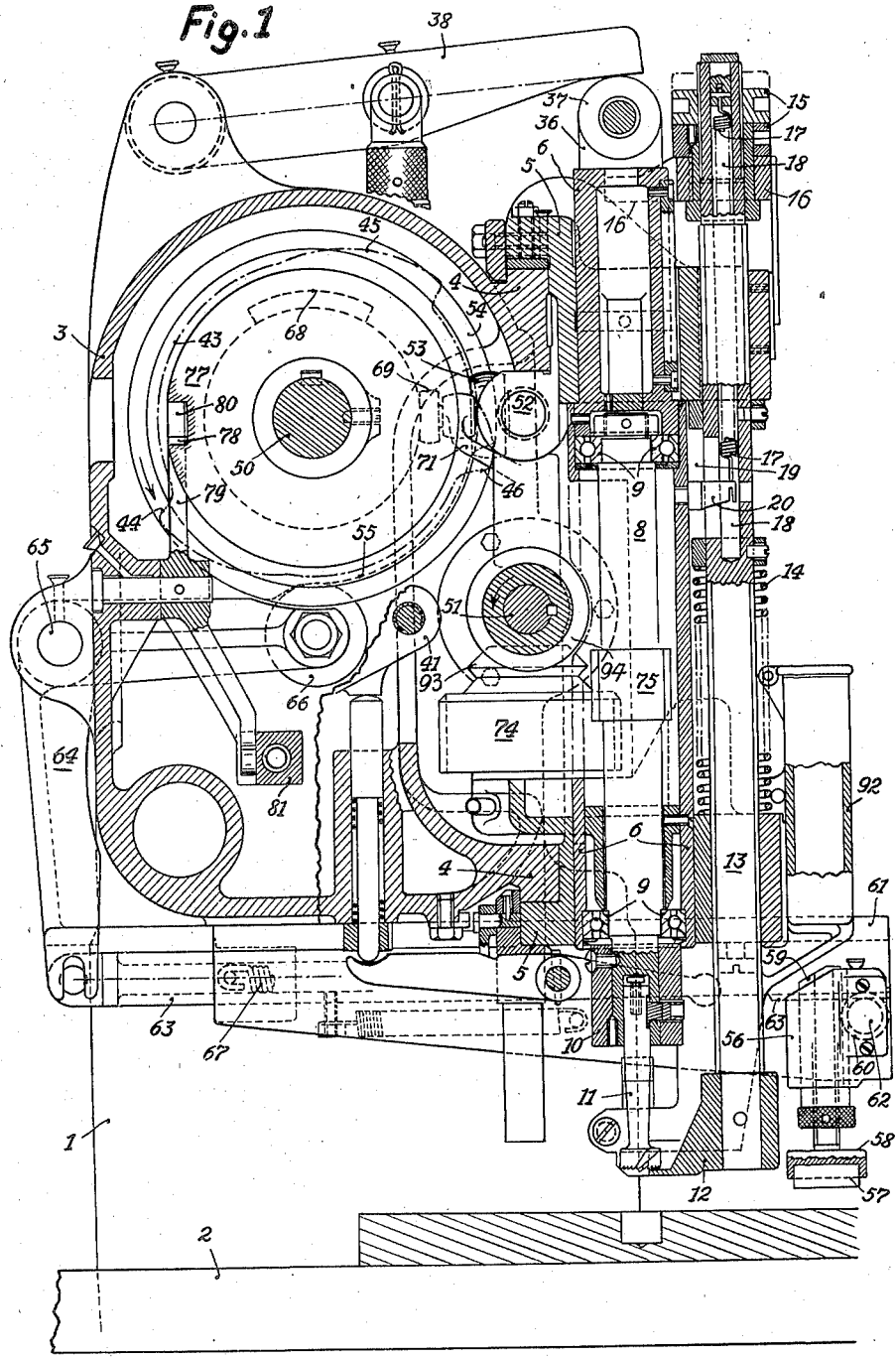
Figure 2:
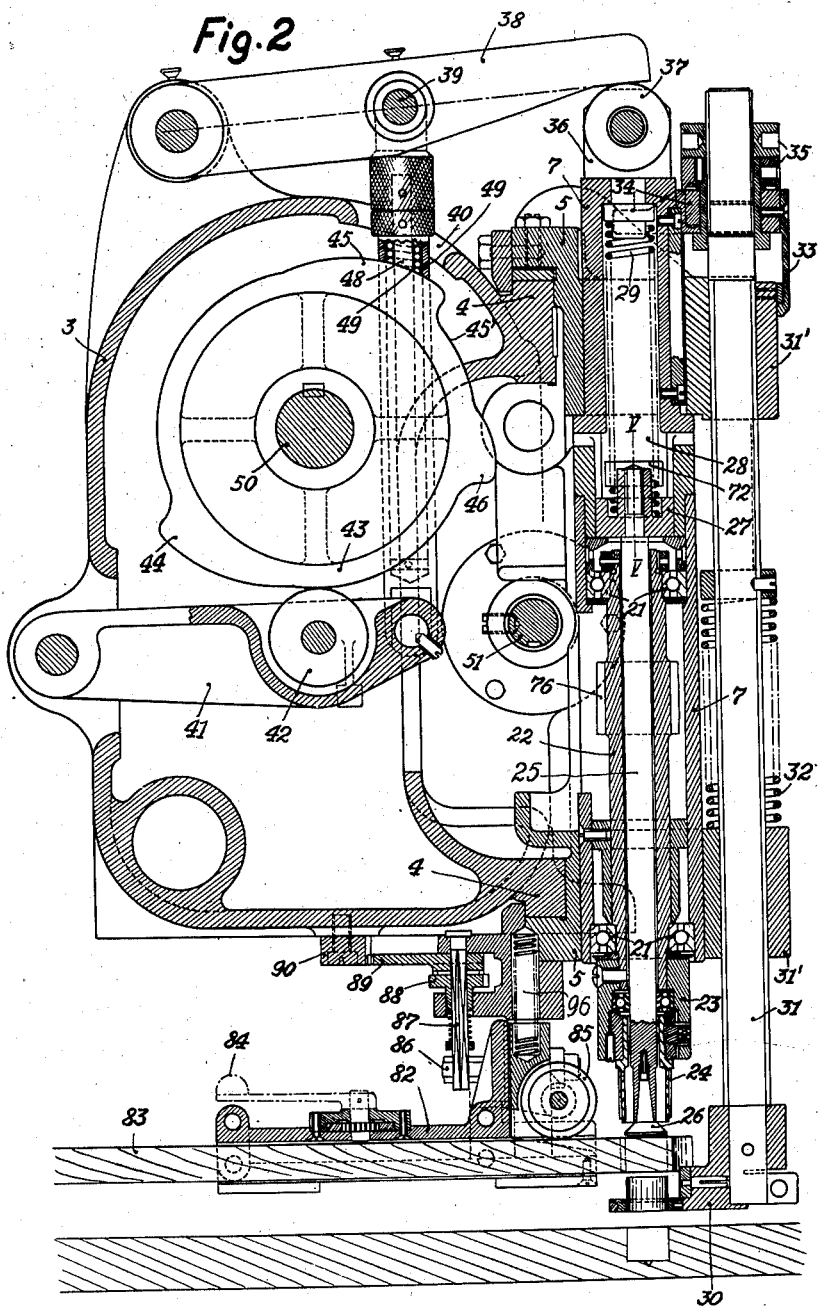

Fig. 1 of the accompanying drawings represents a vertical section of the improved machine taken on the line I—I of Fig. 3, Fig. 2 is a similar section taken on the line II—II of Fig. 3, Fig. 3 is a side view of the machine on a smaller scale, Fig. 4 is a fragmentary, horizontal section of the machine, Fig. 5 is a vertical section on the line V—V of Figs. 2 and 4, Fig. 6 is a plan view of the machine, Fig. 7 is a horizontal section of the machine taken along the main shaft, Fig. 8 is a plan view of the slat feeding device, and Fig. 9 is a sectional detail view.

The machine comprises a frame 1 provided with a work-supporting table 2 and with a tool-supporting arm 3 which overhangs the table. Mounted in guides 4 in the arm 3 is a horizontally movable carriage 5 which supports two vertical slides 6 and 7 arranged in juxtaposition, as shown in Fig. 3. Mounted rotatably in the slide 6 by means of ball bearings 9, is a spindle 8 to the lower end of which a boring tool 11 is secured by means of a chuck 10. The slide 7 carries in the same manner, by means of ball bearings 21, a spindle 22. Secured to the lower end of the latter by means of a chuck 23 is an annular cutter 24 adapted to cut plugs from a wooden slat 83. The carriage 5 is normally maintained by a spring in one of its end positions and is shifted in opposition to the spring for bringing the spindle 22 into the position normally occupied by the spindle 8. This is effected through the medium of a cam 54 which is mounted on a shaft 50 and which co-operates with a roller 53 mounted on an arm 52 from the carriage. The slides 6 and 7 are supported by springs in opposition to which they are depressed for feeding the tools into the work. The depression of the slides is effected through the medium of a cam 43 which is for this purpose provided with three dips 44, 45 and 46. The cam is mounted on the shaft 50 and co-operates with a roller 42 mounted on a pivoted lever 41. Another pivoted lever 38 is connected to the lever 41 by an axially yieldable rod 49, or preferably a pair of rods, each comprising a pair of telescopically adjustable members 49 and a controlling spring 48. The rod or rods enter the arm 3 through an aperture 40 and engage a bolt 39 situated about midway of the length of the lever 38 the free end of which moves in a path occupied by the upper end of whichever slide happens to be in operative position. The slides 6 and 7 are each provided with a head 36 fitted with a roller 37 arranged so as to receive the impact of the lever 38 for lowering the slide.

For rotating the spindles, each of the latter is fitted with a pinion 75 which engages a gear wheel 74. The latter is connected to a conical gear 93 arranged to mesh with a gear 94 which is slidably feathered on the driving shaft 51 of the machine so that it can follow the movements of the carriage. The pinions 75 and the gear wheel 74 are long enough to remain in mesh during the up and down movements of the spindles. The cam shaft 50 receives motion from the shaft 51 through the medium of a worm gear 50'.

Mounted in the carriage 5 opposite the slide 6 is a vertically movable stop rod 13 which carries at its lower end a foot 12 whereby the rod can be supported on the work. A spring 14 tends to raise the rod, and a spring 17, accommodated in an axial bore 18 in the rod, controls the latter by engagement with an arm 20 which is secured to the slide and which enters the rod through an elongated slot 19. A forked arm 16, which can be adjusted on the rod by means of nuts 15, co-operates with the shaft of the roller 37 for limiting the downward movement of the slide 6 when the foot 12 bears against the work.

A similar stop rod 31 is slidably mounted in bearings 31' in the carriage 5 opposite the slide 7 and is fitted at its lower end with a supporting foot 30 which also serves as a holder for the plugs made by the cutter 24. A forked arm 34 which is adjustable by means of nuts 35 on the upper end of the rod, co-operates with the shaft of the roller 37 for limiting the downward movement of the slide 7 when the foot 30 is applied to the work. The boss of the arm 34 carries a hooked member 33 which engages a stop on the contiguous bearing 31' for limiting the upward movement of the rod which is brought about by a spring 32.

The plug-cutting spindle 22 is hollow and accommodates within it a plunger 25 fitted at its lower end with a normally projecting foot 26. A head 27 at the upper end of the plunger is guided within a space 28 in the slide 7 and is engaged by a spring 29 which opposes the upward movement of the plunger relative to the spindle. A slot in the slide 7 holds a stop member 73 (Figs. 4 and 5) which is mounted by means of a vertical dovetail guide in a horizontally movable slide 72 mounted in the carriage 5. The slide 72 is controlled by springs 95 and is coupled to a double-armed lever 71 which rocks about a shaft 70. One arm of the lever carries a roller 69 whereby it bears under the action of the spring 95 against a cam disc 68 mounted on the shaft 50. The stop member 73 moves together with the slide 7 and is at a given moment, under the action of the cam and the lever 71 on the slide 72, advanced into the space 28 of the slide 7 so as to lock the plunger 25 to the latter by engagement with the head 27, as shown in Fig. 5.

For securing the work to the table 2 during the operation of the tools, a presser foot 58 having a rubber facing 57, is provided. The presser foot is connected to a vertical rack 59 which meshes with a pinion 60 mounted at one end of a shaft 62 carried by a member 61 of the arm 3. A pinion at the other end of the shaft 62 meshes with a horizontal rack 63 connected to a bell crank 64. The latter rocks about a pivot 65 and carries a roller 66 which co-operates with a cam 55 on the shaft 50 for applying the presser foot 58 to the work. The rack 63 is composed of telescopically adjustable members which are controlled by a spring 67 so that the presser foot 58 can yield and adapt itself to work of different vertical dimensions.

The slat 83 from which the plugs are made is arranged in a holder 82 between guides 83' which are adjustable by means of a hand lever 84 and a pinion 84' engaging racks on the guides. A friction wheel 85, which bears against the slat 83 for feeding the latter towards the plug cutter 24, receives intermittent motion from a ratchet drive 88 through the medium of shafts 87 and 86 and gears 86' and 87'. The pawl of the ratchet drive is mounted on the boss of a toothed segment 89 which meshes with a rack 90 and which is rocked by the latter about the shaft 87 on the carriage 5 being shifted from one end position to the other. The holder 82 is capable of slight vertical movement and is normally maintained by a spring 96 in its highest position. The slat 83 is slightly wider than the internal diameter of the cutter 24 and slightly smaller than the external diameter of the same so that all the waste will be cleared away by the cutter.

A glue container 92 is mounted on the carriage and provided with a delivery nozzle 91 capable of projecting a conical jet of glue into the bore hole for coating not only the bottom but also the sides of the hole with glue. The nozzle is arranged so as to pass the bore hole on the carriage being shifted for bringing the plug cutting tool into operative position, and the spray is operated at the appropriate moment through the medium of a plunger 92' and an operating lever 91'.

The driving shaft 51 is continuously rotated, and a clutch 94' is used for coupling this shaft to the cam shaft 50. The clutch is operated through the medium of a bell crank 93' (Fig. 7) and a rod 81 which also rocks a double-armed lever 79. The latter carries a lug 80 whereby it bears by spring action against a disc 77 mounted on the cam shaft 50. Normally the lug engages in a notch 78 in the disc and secures the mechanism in position of rest. When the rod 81 is pulled for coupling the two shafts together, the lug 80 is withdrawn from the notch 78 so as to release the cam shaft. On the release of the rod 81, the lug 80 will, by its engagement with the disc 77, retain the clutch in operation in opposition to a spring 81' (Fig. 7). After one revolution of the shaft 50, the lug 80 will again snap into the notch 78, thereby causing the clutch to be disengaged and the cam shaft to be locked.

The machine operates as follows:

After the size and depth of the holes have been decided upon, boring and plug-cutting tools of the required dimensions are secured to the spindle; a slat of the required width and thickness is applied to the holder 82; and the forked members 16 and 34 are adjusted so as to limit the penetration of the tools according to the desired depth of the holes. A plug of the required dimensions is applied to the holder of the foot 30, as shown in Fig. 2. The shaft 51 can now be set in motion for imparting rotation to the spindles, and the work is moved on the table 2 until a knot is in position under the boring tool 11. Thereupon the rod 81 is pulled for coupling the shaft 51 to the shaft 50 and for releasing the latter. As the cam shaft moves, the roller 66 will first be depressed by the cam 55, and the lever 64 will be rocked for applying the presser foot 58 to the work and securing the latter in operative position. Any excess movement of the lever 64 will be taken up by the axially yieldable rack 63. The dip 44 of the cam 43 will now come into operation for rocking the levers 41 and 48, and the slide 6 will be depressed for feeding the boring tool 11 into the work. By the pull of the arm 20 on the spring 17, the stop rod 13 will also be depressed and applied by means of the foot 12 to the work. The boring tool descends until the shaft of the roller 37 strikes against the fork member 16, and further movement of the lever 41 will then be taken up by the springs 48 in the connecting rods 49. When the dip 44 of the cam has passed the roller 42, the slide 6 will be released, and the latter and the stop rod 13 will be restored by the springs to their initial positions. Thereupon the cam 54 begins to act on the roller 53 for shifting the carriage in opposition to a spring for bringing the plug cutter into the position previously occupied by the boring tool. During this travel, the glue spray is operated for coating the bottom and the side walls of the bore hole with glue. The segment 89 is also actuated for moving the friction wheel 85 which feeds the slat 83 forwards until it abuts against the foot 30. After the carriage has been shifted, the slide 7 will be in operative position under the lever 38 so that, when the latter is rocked by the cam dip 45, the plunger 25 will be applied to the slat 83. The latter descends onto the plug in the holder of the foot 30, and the foot will be applied to the work. The plug cutter 24 works around the foot 26 which, under the pressure of the spring 29, holds the newly formed plug in position. After the plug has been cut, the slide 7 is retracted, while the plunger 25 is retained by its spring in contact with the plug, the cam portion 45' between the dip 45 and the next cam dip 46 being adapted to maintain the springs in tension while allowing the slide 7 to rise sufficiently for the stop member 73 to be thrust into engagement with the head 27 of a plunger. This is effected in due course by the action of the cam 68. Thus, when the slide 7 is depressed by the next cam dip 46, the plunger will be locked to the slide and unable to yield except as far as allowed by the connecting rods 49. Therefore, the two plugs will be actuated by the plunger, the plug in the holder of the foot 30 being forced into the bore hole, and the newly formed plug being forced into the holder. As the foot 30 bears against the work, the descending movement of the plunger will be limited by the abutment of the shaft of the roller 37 against the fork member 34. Thereupon the stop member 73 is withdrawn from its engagement with the plunger head, and when the slide is released by the cam dip 46 and the carriage is released by the cam 54, all the elements will be restored to their initial positions. The lug 80 then snaps into engagement with the notch 78, thus disengaging the clutch and locking the cam shaft in position of rest.

The resiliency of the connecting rod or rods 49 is an important feature, since it allows, within given limits, the feeding movement of the tools to remain constant irrespective of the elevation of the surface of the work. It also prevents breakage in case the slides should for some reason or other be prevented from moving.

I claim:

1. A machine for boring and plugging holes in wood, comprising a frame, a horizontally moving carriage in said frame, a pair of vertical, rotatable and axially displaceable spindles mounted in juxtaposition in said carriage, means for shifting the carriage to bring either spindle into the same operative position, means for rotating the spindles, means for imparting axial reciprocation to the spindles, a boring tool secured to one spindle, a plug cutting tool secured to the other spindle, a table for supporting the work under the spindles, means for feeding a wooden slat to the plug cutting tool, and means for forcing the plugs made by the latter from said slat into the holes made by the boring tool.

2. A machine for boring and plugging holes in wood, comprising a frame, a horizontally movable carriage in said frame, a pair of vertically movable slides supported in juxtaposition in said carriage, a vertical spindle mounted rotatably in each slide, means for shifting the carriage to bring either spindle into the same operative position, means for rotating the spindles, resiliently operating means for imparting axial reciprocation to the slides and spindles, a boring tool secured to one spindle, a plug cutting tool secured to the other spindle, a table for supporting the work under the spindles, means for feeding a wooden slat to the plug cutting tool, and means for forcing the plugs made by the latter from the slat into the holes made by the boring tools.

3. The structure claimed in claim 2 in combination with a vertically displaceable, spring-controlled stop rod mounted in the carriage opposite each slide, a foot at the lower end of each stop rod, means associated with these slides for applying said foot to the work during the operation of the spindle, and adjustable means on said stop rod for limiting the downward movement of the slide and spindle.

4. A machine as claimed in claim 2 wherein the means for forcing the plugs into the holes comprises a plunger mounted in a central bore in the plug cutting spindle and normally projecting through the plug cutting tool, a head on said spindle guided in the slide of said spindle, a spring bearing against the head and tending to force the plunger against the slat when the spindle is lowered, a movable stop in the slide of the plug cutting spindle adapted to enter into engagement with said head for locking the plunger to the spindle, and automatically operating means for thus locking the plunger after the cutting of the plug so that it will be operated during the next reciprocation of the slide for forcing the plug into the bore hole.

5. A machine as claimed in claim 2 wherein the means for reciprocating the slides comprises a spring tending to maintain each slide in raised position, a pair of pivoted levers, an axially yielding rod connecting the two levers, and a cam co-operating with one of said levers for rocking both levers, the other lever being arranged so as to have the operatively disposed slide in its path for operating it in opposition to the spring.

GOTTFRIED MAURER.